United States Patent
Berko et al.

(10) Patent No.: US 12,255,885 B2
(45) Date of Patent: Mar. 18, 2025

(54) USER IN GROUP BEHAVIOR SIGNATURE MONITOR

(71) Applicant: Acronis International GmbH, Schaffhausen (CH)

(72) Inventors: Nickolay Berko, Schaffhausen (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 162 days.

(21) Appl. No.: 17/804,823

(22) Filed: May 31, 2022

(65) Prior Publication Data
US 2023/0388292 A1 Nov. 30, 2023

(51) Int. Cl.
*H04L 9/40* (2022.01)
(52) U.S. Cl.
CPC .......... *H04L 63/083* (2013.01); *H04L 63/102* (2013.01); *H04L 63/107* (2013.01); *H04L 63/1416* (2013.01); *H04L 63/1425* (2013.01)
(58) Field of Classification Search
CPC ... H04L 63/083; H04L 63/102; H04L 63/107; H04L 63/1416; H04L 63/1425
USPC .......................................................... 726/4
See application file for complete search history.

(56) References Cited

U.S. PATENT DOCUMENTS

| | | | |
|---|---|---|---|
| 9,641,544 B1 * | 5/2017 | Treat | H04L 43/04 |
| 9,674,202 B1 * | 6/2017 | Margel | H04L 63/0428 |
| 10,110,634 B2 * | 10/2018 | Amar | H04L 67/535 |
| 10,419,466 B2 | 9/2019 | Ferguson et al. | |
| 10,454,939 B1 * | 10/2019 | Amram | H04L 63/104 |
| 10,516,693 B2 * | 12/2019 | Stockdale | H04L 63/1441 |
| 10,586,036 B2 | 3/2020 | Turgeman | |
| 10,691,796 B1 * | 6/2020 | Stolte | G06Q 10/0635 |
| 11,095,722 B2 | 8/2021 | Kursun | |
| 11,250,126 B2 | 2/2022 | Strogov et al. | |
| 11,403,389 B2 | 8/2022 | Karasev et al. | |
| 11,423,478 B2 * | 8/2022 | Dodson | G06Q 40/04 |
| 2007/0245420 A1 * | 10/2007 | Yong | H04L 43/00 726/23 |

(Continued)

FOREIGN PATENT DOCUMENTS

| | | |
|---|---|---|
| CN | 109120629 A | 1/2019 |
| CN | 111865941 A | 10/2020 |
| KR | 1020170030733 A | 3/2017 |

*Primary Examiner* — Thanh T Le
(74) *Attorney, Agent, or Firm* — ESPE Legal Consultancy FZ-LLC

(57) ABSTRACT

A system of monitoring a user behavior for abnormalities compared to a group behavior includes a processor configured to implement instructions for a user to group behavior signature monitor (UGBSM) with at least one user, as a monitored user, and a group of one or more users, as baseline users, to access to certain characteristics of the monitored user and certain characteristics of the baseline users, calculate a user behavioral signature of the monitored user, calculate a group behavioral signature of the baseline users, calculate a degree of variance (DoV) between the user behavioral signature of the monitored user and the group behavioral signature of baseline users, and compare the calculated DoV to a variance threshold to determine whether the user behavioral signature of the monitored user is similar or is different from the group behavioral signature of the baseline users.

20 Claims, 3 Drawing Sheets

(56) References Cited

U.S. PATENT DOCUMENTS

| | | | |
|---|---|---|---|
| 2007/0255818 A1 | 11/2007 | Tanzer et al. | |
| 2013/0097709 A1* | 4/2013 | Basavapatna | H04L 63/1441 726/25 |
| 2013/0111586 A1* | 5/2013 | Jackson | G06F 21/316 726/23 |
| 2016/0300049 A1* | 10/2016 | Guedalia | G06V 30/1985 |
| 2017/0279616 A1 | 9/2017 | Loeb et al. | |
| 2017/0353477 A1* | 12/2017 | Faigon | G06F 21/554 |
| 2018/0255077 A1* | 9/2018 | Paine | H04L 63/1416 |
| 2018/0288175 A1* | 10/2018 | Vuornos | H04L 67/535 |
| 2019/0260795 A1* | 8/2019 | Araiza | H04L 67/12 |
| 2020/0242269 A1* | 7/2020 | Narayanaswamy | G06F 21/55 |
| 2020/0259852 A1* | 8/2020 | Wolff | H04L 67/10 |
| 2022/0407893 A1* | 12/2022 | Maiman | H04L 63/205 |
| 2022/0417277 A1* | 12/2022 | Ben-Noon | H04L 63/102 |
| 2023/0096108 A1 | 3/2023 | Malanov et al. | |
| 2023/0231854 A1* | 7/2023 | Blake | H04L 63/1425 726/4 |
| 2023/0300112 A1* | 9/2023 | Wood | H04L 63/1441 726/22 |
| 2023/0308460 A1* | 9/2023 | Thomas | H04L 63/102 |

\* cited by examiner

USER IN GROUP BEHAVIOR SIGNATURE MONITOR

TECHNICAL FIELD

The invention pertains to computer systems and protection of data on these computer systems from loss by actions caused by people or events, such as threat agents and threat events.

BACKGROUND

Computer systems rely in their functionality on different types of data that include but are not limited to operating system, applications, application settings, files (contents and metadata), data in transit (e.g., part of network traffic), data in computer memory (e.g., application variables and clipboard), and databases or other data storages.

Information security (INFOSEC) systems are designed for keeping information confidential, available, and assuring its integrity.

A specific subclass of INFOSEC systems are Data Loss Prevention (DLP) systems that enforce information (1) storage and (2) transfer rules.

First, DLP systems enforce the storage rules demanding that certain types of information are stored only in approved locations and may take steps in case if such system detects certain information in an unauthorized location.

Second, DLP systems make sure that information may only be transmitted by a sender who has permission to send such information to a receiver who has permission to receive such information from the sender.

DLP systems deploy numerous controls including preventive, detective (e.g., controls designed to detect attacks, errors or irregularities), and corrective (e.g., controls designed to mitigate attacks, correct errors or irregularities). Currently, DLP systems use pre-defined terms provided by a vendor or manually configured sets of rules that govern their controls.

Computer systems may include individual devices (nodes) that use networks and peripheral devices to communicate between themselves. Some of these devices are computers, network routers, intrusion detection systems, network attached storage (NAS) devices, USB Flash Drives, no name just a few.

Computer systems utilize a notion of "users" to denote individual people and applications (e.g., service accounts) to describe permissions and track actions within these systems.

Further, computer systems utilize a concept of "user groups" to define a common set of permissions and characteristics for different similarly situated "users".

Current DLP, security, and many other types of systems monitor behavior of users for signs of abnormalities. Normally, these abnormalities have to be pre-programmed or pre-defined by the monitoring system, such as, an attempt to upload data to a restricted (e.g., public) website, copying such data to a peripheral (e.g., a USB storage device) device, an attempt to download or run an application from the list of known malicious programs, an attempt to access a blocked website, and an attempt to send an executable file as an attachment.

In many cases, it is hard or even impossible for the designers of the security software to predict the specific behavior of a person or a group of people that may result in a security incident.

For that specific reason, it is customary to divide users of a system into groups and assign rights to each group separately in such a way that one user may be in different groups, and some groups may consist of a single user or even be empty.

In many cases permissions are given to a group to access specific resources. Examples of such resources include directories, peripherals, or network equipment, such as printers.

In some cases, such access is restricted by time. For example, a user can log in only on certain days of the week during work hours. Or a user may be allowed to download only a certain amount of data. Alternatively, a user is allowed login based on location, such as by having certain GPS coordinates or other restrictions may be imposed, including restrictions that appear to be static limitations.

In some cases, users from one group are prohibited from communicating with a certain list of other users. For example, the prohibitions could implement ethical walls required by legal firms or financial institutions.

In yet other cases, users form a group implicitly. For example, a community of users who have access to a certain system, such as an online knowledge repository, form a group.

The shortcoming of such systems is the fact that many other types of activities that a user may perform could be an indication of a security incident. A security incident generally comprises a set of one or more events that may compromise the privacy, integrity, or availability of data within a computer system.

A user who is generally authorized to perform certain actions may still perform other actions that amount to misconduct and a security incident. An example is an ordinary user who does not follow computer-security policies.

The main problem with conventional systems is that only a limited number of criteria can be added to the monitoring system to raise an incident when a user performs a certain action or a set of actions. A typical example is when the user downloads an abnormally large number of files from a corporate file storage.

SUMMARY

The invention is directed to providing a system and a method for identification of anomalies in user behavior by comparing characteristics of user behavior to characteristics of group behavior.

Because a malicious or otherwise non-complying user is different from other complying users, the behavior of such a user is different from the behavior of other users in the same group.

The invention also allow for identification of potential collisions that otherwise may stay unnoticed by existing systems. For example, if one user is downloading an abnormally large amounts of data from certain storage of protected data, but neither sends a comparable information using any of communication means nor copies it to peripheral devices, and another user either sends a comparable abnormally large amount of data using one of the communication methods or copies a comparable amount of data to peripheral devices, one might infer that these two users are colliding to exfiltrate protected information outside of the company's protected perimeter. Again, behavior of both users would be determined as abnormal by the system. The parameters of both highlighted events can be investigated and lead to an obvious inference.

The invention monitors other behavioral characteristics such as percentage of emails forwarded to a personal account, peak email activity, peak access to peripheral devices, peak access to printers, use of printers outside of business hours, etc.

In embodiments, the invention also monitors more complex user behavior consisting of multiple events or characteristics, e.g., downloads from a knowledge base followed by writing to a peripheral device or printing or unsuccessful sending of a protected document followed by sending of an encrypted document of the same size. In the first case, e.g., in a technical service environment, certain copying from an online source to a USB device may be everyday behavior but downloading several gigabytes of data and copying it to an external hard drive may raise a red flag. In the second case, the policy may be to only send documents via email in an encrypted form, but the average number of mistakes when a document is first attempted to be sent in the open or the fact that only some documents were sent in an encrypted form may raise a red flag.

In general, behavior related to amounts, type, source, destination, mode of storage, mode of transfer, compression, encryption of data and other similar characteristics of each user and the group may be compared among many other possible behavioral characteristics.

The invention proposes comparing certain aspects of the digital behavior of each individual user to groups of other similarly situated users based on different grouping criteria.

The invention proposes automating detection of the monitored user behavior that deviates from baseline behavior of a related (baseline) group of users by (1) creating the User Behavioral Signature of the Monitored User ($UBS_{MU}$), (2) creating the Group Behavioral Signature of Baseline Users ($GBS_{BU}$), and (3) calculating the Degree of Variance (DoV) between $UBS_{MU}$ and $GBS_{BU}$, and comparing the calculated DoV to the predetermined Variance Threshold (VT).

If DoV is greater (or greater or equal) than VT, then the system determines that the behavior of the monitored user is abnormal. Optionally, the system takes an action (e.g., raises a security incident or generates and sends a message to the group of admins in charge of the system).

If DoV is smaller (or smaller or equal) to the VT, then the system determines that the behavior of the monitored user is normal. No action is taken.

The system also allows for advance planning and preventive actions by monitoring the DoV value over time. For example, if the DoV for a given Monitored User is growing (e.g., the number of files downloaded by the Monitored User from the corporate file storage keeps growing monthly), but yet has not reached the VT, then a prognosis may be made that it may surpass it in the future, and preventive actions may be taken by the management of an entity to prevent a security incident.

There are multiple examples of differences between the behavior of the group and an individual user that may indicate a potential security incident, e.g., a data leakage event, e.g., (1) user visiting websites that other group members never visit; (2) user accessing a larger than normal amount of data in corporate file storage; (3) user transferring a larger than normal amount of data via email, other messaging or to a peripheral device; (4) user communicating with respondents that nobody from the groups corresponds with; (5) user sending regular communications, e.g., timesheets or quarterly reports, to a recipients different from the main group, (6) user transferring data to peripheral devices more often than the rest of the group, etc.

BRIEF DESCRIPTION OF DRAWINGS

The exemplary aspects of the invention will be better understood from the following detailed description of the exemplary embodiments of the invention with reference to the drawings.

DETAILED DESCRIPTION

Figure 1:
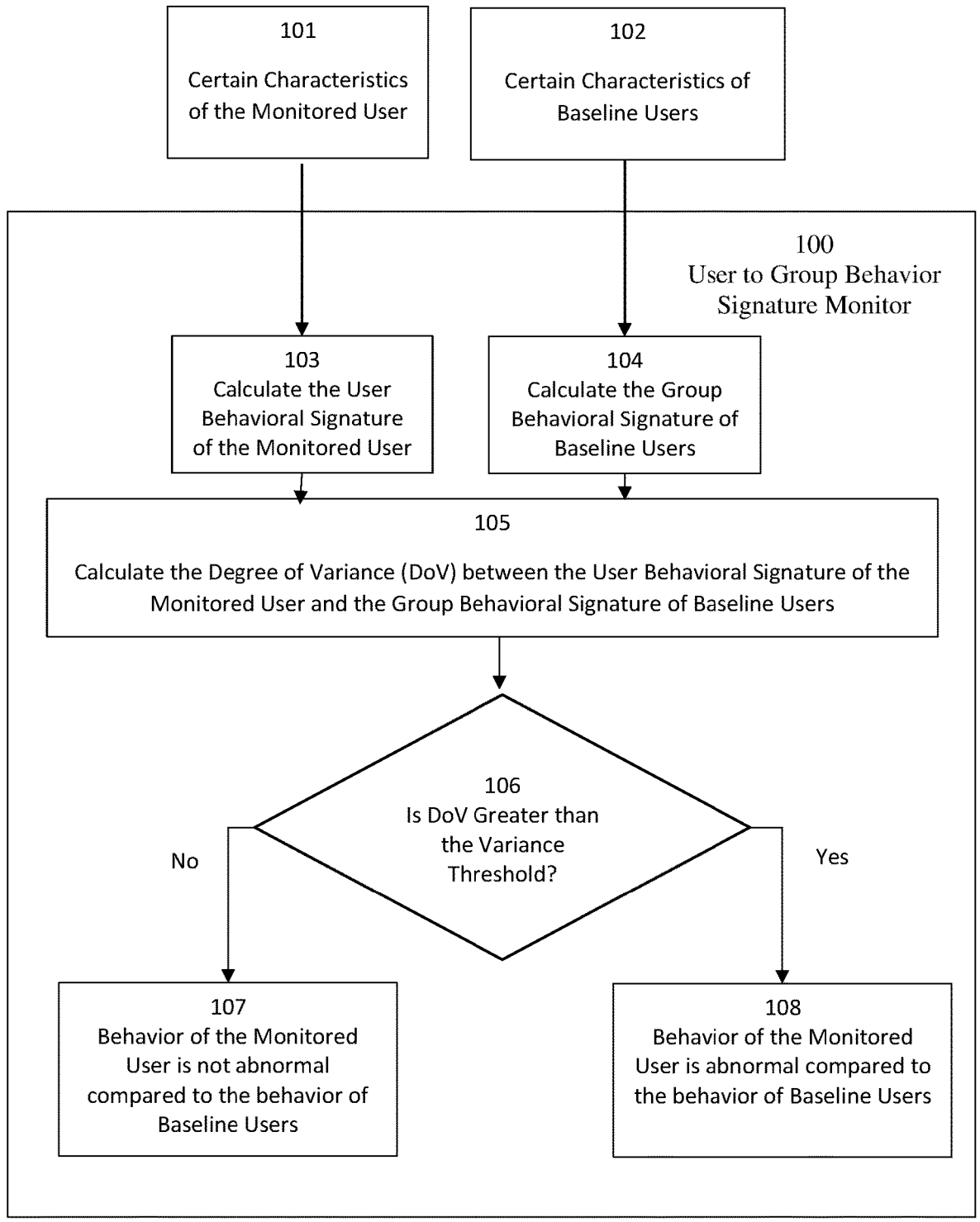
FIG. 1 shows an exemplary procedure for an operation of a User to Group Behavior Signature Monitor according to an exemplary embodiment.

A DLP with User to Group Behavior Signature Monitor (UGBSM) implements a DLP that monitors behavior of an individual user (the Monitored User). The UGMSM also monitors behavior of a group of one or more users. These groups comprise Baseline Users and may or may not include the Monitored User. The UGBSM further compares characteristics of the Monitored User to the characteristics of the Baseline Users and identifies at least one abnormality related to the Monitored User that indicates a security incident.

User activities such as communications, data transfer, use of different data types, use of different data exchange channels, authentication, use of an application, or visiting a website, gives access to user-related data. User activities are often repeated.

In an embodiment, the UBGSM monitors email attachments sent by group members. If no group member ever attached an archived, encrypted file, the UBGSM detects the event as a potential data leakage incident. The UBGSM monitors a user activity and creates one or more behavioral signatures for individual users and groups of users. A behavioral signature is an array, such as a vector, containing average values representing observed events of a period of time for one user or a group of users.

A distance or degree of variance refers to a function of any two behavioral signatures of a user or a group. In an embodiment, the degree of variance between two behavioral signatures comprises mathematical vector multiplication of two vectors representing behavioral signatures of these users or groups.

One or more thresholds are predetermined and used to decide whether two behavioral signatures are similar or not.

When a group signature is used, if a degree of variance between a group behavioral signature and a user behavior signature is less (or less or equal) than a group similarity threshold, then the user behavior is similar to the group behavior.

When a group signature is used, if a degree of variance between a group behavioral signature and a user behavior signature is greater (or greater or equal) than a group variance threshold, then the user behavior is different from the group behavior.

The group similarity threshold may equal or be different from the group variance threshold. A typical case is the comparison of user behavior signatures of two users to determine their similarity or difference.

When individual user behavioral signatures of users within a group are used, a group variance threshold for a group of individual users may be defined as a maximum value of degree of variance between any two user behavioral signatures in a group.

For example, if users within a group frequently send different types of Microsoft Office documents as attachments, some send Excel documents, a user who sends a rare, encrypted archive, such as a ZIP or a RAR file, will be detected as different from the group.

When the maximum of the degree of variance of a behavioral signature of a user A (within or outside of the group G) and all members $U_1, \ldots, U_n$ of the group G is less (or less or equal) than the group similarity threshold of a given group, the user's behavior is similar to the behavior of the group.

When the maximum of the degree of variance of a behavioral signature of a user A (within or outside of the group G) and all members $U_1, \ldots, U_n$ of the group G is greater (or greater or equal) than the group variance threshold of a given group, the user's behavior is different from the behavior of the group.

Groups of users with a similar behavior are identified when the degree of variance between user behavioral signatures is lower than a predetermined threshold. Users within groups whose behavior is different from the behavior of the group are identified when the degree of variance between group behavioral signature and user behavioral signature is greater than or equal to a predetermined threshold. Groups with similar behavior are identified when the degree of variance of group behavior signatures is lower than a predetermined threshold. Users outside of a given group with behavior similar to the given group are identified when the degree of variance between the group behavioral signature and the user behavioral signature is smaller than or equal to a predetermined threshold).

In some cases, misuse or abuse of secure information systems starts insignificantly and then grows over time. User behavior is predicted, and corrective action applied preemptively. For example, when the degree of variance between a given user behavioral signature and the group behavioral signature grows over time, but yet does not cross the group variance threshold, the invention predicts that they will cross the threshold in the future and takes an appropriate action.

Additionally, by lowering or elevating the threshold of similarity or the threshold of variance, the system adjusts its sensitivity.

In an embodiment, one set of characteristics of the Monitored User is compared to another set of characteristics of the Monitored User. For example, historic activity over a long period of time is compared to recent activity over a short period of time.

In another embodiment, the activity of the Monitored User is compared to a user group to which the Monitored User formally belongs according to one or more system settings.

Yet another embodiment is directed to comparing the activity of the Monitored User to the activity of one or more selected users according to certain criteria.

A UGBSM may indicate an incident or modify user access rights if behavior of an individual user within that group deviates or falls outside of a certain margin from certain criteria generated based on that UGBSM's observation of behavior of users within such group.

Exemplary embodiments will now be described with reference to the drawings.

FIG. 1 shows an exemplary procedure for an operation of a User to Group Behavior Signature Monitor (UGBSM) (100) according to an exemplary embodiment.

UGBSM (100) obtains access to the Certain Characteristics of the Monitored User (101) and Certain Characteristics of Baseline Users (102), in any order.

Using Certain Characteristics of the Monitored User, the UGBSM (100) calculates the User Behavioral Signature of the Monitored User in step (103).

Further, using Certain Characteristics of Baseline Users, the UGBSM (100) calculates Group Behavioral Signature of Baseline Users in step (104).

Furthermore, the UGBSM (100) calculates the Degree of Variance (DoV) between the User Behavioral Signature of the Monitored User and the Group Behavioral Signature of Baseline Users in step (105).

The UGBSM (100) further compares the calculated DoV to the Variance Threshold in step (106).

If the DoV is greater (or greater or equal) than the Variance Threshold, then the UGBSM (100) determines that the behavior of the Monitored User is abnormal compared to the behavior of Baseline Users in step (108).

If DoV is less or equal to the Variance Threshold, then the UGBSM (100) determines that the behavior of the Monitored User is not abnormal compared to the behavior of Baseline Users in step (107).

Figure 2:
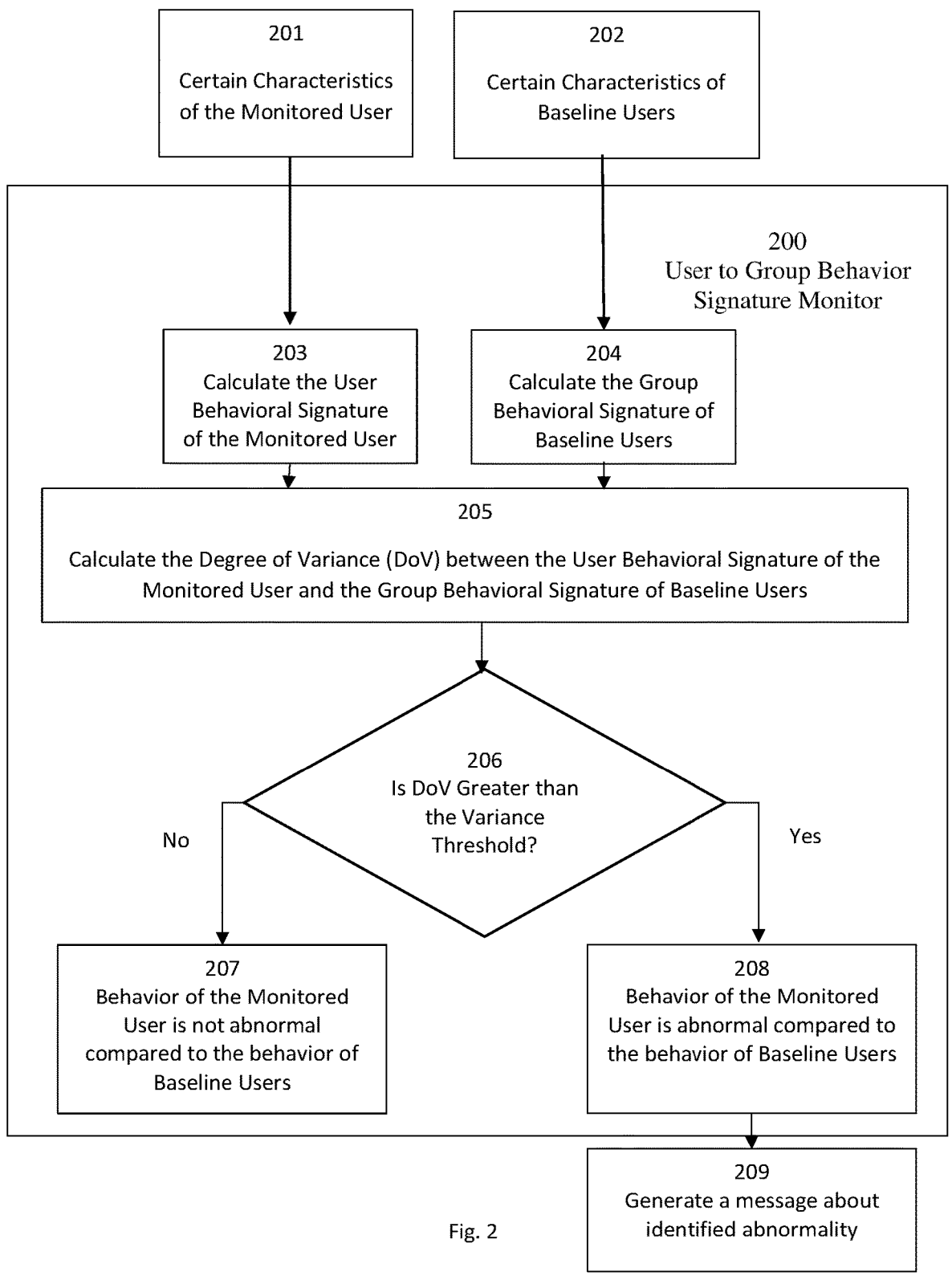
FIG. 2 shows an exemplary procedure for an operation of an embodiment of a User to Group Behavioral Signature Monitor that outputs information about identified abnormality.

FIG. 2 shows the operation of an embodiment of UGBSM 200 that outputs information about the identified abnormality.

At some point, UGBSM (200) obtains access to the Certain Characteristics of the Monitored User (201) and Certain Characteristics of Baseline Users (202), in any order.

Using Certain Characteristics of the Monitored User, the UGBSM (200) calculates the User Behavioral Signature of the Monitored User in step (203).

Further, using Certain Characteristics of Baseline Users, the UGBSM (200) calculates Group Behavioral Signature of Baseline Users in step (204).

Furthermore, the UGBSM (200) calculates the Degree of Variance (DoV) between the User Behavioral Signature of the Monitored User and the Group Behavioral Signature of Baseline Users in step (205).

The UGBSM (200) further compares the calculated DoV to the Variance Threshold in step (206).

If the DoV is greater (or greater or equal) than the Variance Threshold, then the UGBSM (200) determines that the behavior of the Monitored User is abnormal compared to the behavior of Baseline Users in step (208) and generates a message about the identified abnormality in step (209).

If DoV is less or equal to the Variance Threshold, then the UGBSM (200) determines that the behavior of the Monitored User is not abnormal compared to the behavior of Baseline Users in step (207).

Figure 3:
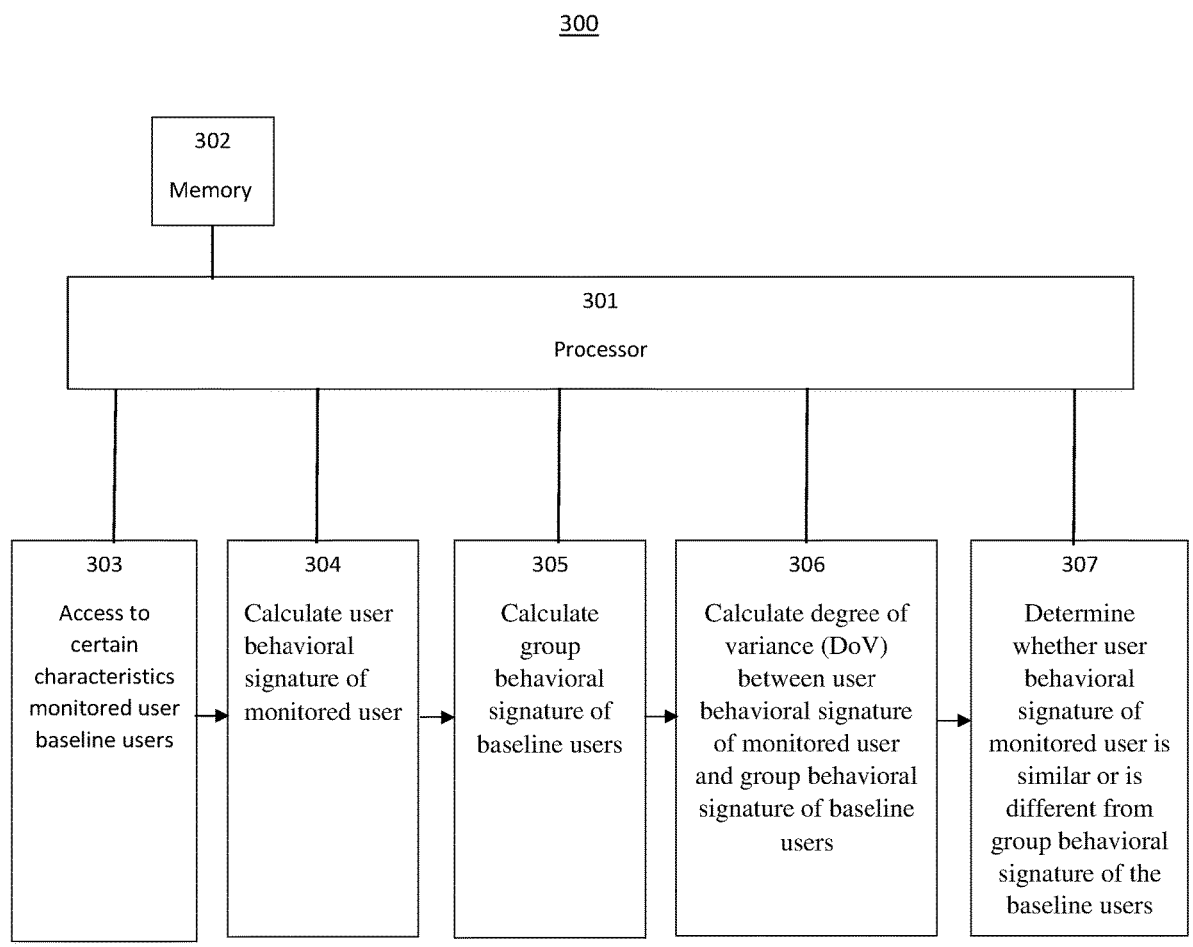
FIG. 3 shows the components and interactions of an exemplary system for a User to Group Behavioral Signature Monitor embodying the invention.

In an exemplary aspect, as shown in FIG. 3, system (300) automatically manages assignments of users to groups.

System (300) includes a processor (301) (e.g., Central Processing Unit (CPU)) of a computer coupled to a memory (302) that stores instructions that are implemented by the processor (301).

The processor (301) is configured to implement the instructions for system (300) of monitoring a user behavior for abnormalities compared to a group behavior.

More specifically, the processor (301) is configured to implement the instructions for a user to group behavior signature monitor (UGBSM) with at least one user, as a monitored user, and a group of one or more users, as baseline users, to access to certain characteristics of the monitored user and certain characteristics of the baseline users, in step (303).

Further, the processor is configured to calculate a user behavioral signature of the monitored user, in step (304), and calculate a group behavioral signature of the baseline users, in step (305).

Furthermore, the processor is configured to calculate a degree of variance (DoV) between the user behavioral signature of the monitored user and the group behavioral signature of baseline users, in step (306).

Moreover, the processor is configured to compare the calculated DoV to a variance threshold to determine whether the user behavioral signature of the monitored user is similar or is different from the group behavioral signature of the baseline users, in step (307).

In an embodiment, such a UGBSM observes actions of applications related to the Monitored User or Baseline Users. These applications may be running on (1) individual user's computers, (2) when individual user is logged in, (3) when individual user is logged off, (4) under individual user's credentials, (5) under other credentials, but sharing access to at least one resource with individual users' context, or (6) be related to the user in some other way.

In an embodiment, such a UGBSM observes beginning, end, frequency, or duration of events related to the Monitored User or Baseline Users.

In an embodiment, such a UGBSM observes authentication events related to the Monitored User or Baseline Users.

In an embodiment, such a UGBSM observes access to a user's computer, a mobile device, or other hardware devices related to the Monitored User or Baseline Users.

In an embodiment, such a UGBSM observes a user activity in a web browser related to the Monitored User or Baseline Users.

In an embodiment, such a UGBSM observes a network traffic, such as IP addresses, port numbers, protocol types, volumes of data sent and received, or types of information sent or received (e.g., types of files sent via FTP) related to the Monitored User or Baseline Users.

In an embodiment, such a UGBSM observes access to cloud services including but not limited to file storage, collaboration, electronic mail, scheduling, file sharing, database, analytical, etc., related to the Monitored User or Baseline Users.

In an embodiment, such a UGBSM observes geolocation of computers or mobile devices related to the Monitored User or Baseline Users.

In an embodiment, such a UGBSM observes user access to certain individual database record or groups of database records related to the Monitored User or Baseline Users.

In an embodiment, such a UGBSM observes the communications such as email (e.g., sender, receiver, CC, BCC, size and time or the attachment(s), time sent, time received, etc.), SMS (e.g., time sent, time received, sender, receiver, read indicator), MMS, FTP related to the Monitored User or Baseline Users.

In an embodiment, such a UGBSM performs an analysis with predetermined heuristic rules, statistical analysis, neural network, or support vector machines.

In an embodiment, such a UGBSM performs an action (e.g., raises an incident) or communicates certain information about discovered abnormality to at least one destination (e.g., ticket tracking system or system administrator).

Example implementations include an apparatus for performing the operations described by virtue of computer programs with instructions for carrying out the necessary steps. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the invention Further, some example embodiments are performed solely in hardware, whereas other example embodiments are performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed or encrypted format.

The invention claimed is:

1. A method for monitoring user behavior of a user of a computing system for abnormalities compared to baseline users of the computing system by reference to a database storing information about previously classified activities of a plurality of baseline users, the method comprising:

monitoring an activity of the user of the computing system using a behavior signature monitor, wherein the behavior signature monitor is a software module under program control of a microprocessor and wherein the activity comprises one of the previously classified activities;

calculating, with the behavior signature monitor, a user behavioral signature for the activity as a new behavior vector of values representing event data from the monitored activity;

calculating a group behavioral signature of the plurality of baseline users for the activity, wherein the group behavioral signature of the plurality of baseline users is a previous behavior vector of values representing event data from a previously classified activity corresponding to the monitored activity;

calculating a degree of variance (DoV) by mathematical vector multiplication of the user behavioral signature of the user and the group behavioral signature of the plurality of baseline users, wherein the DoV is a distance between the new behavior vector and the previous behavior vector;

comparing the calculated DoV to a predetermined variance threshold to determine whether the user behavioral signature of the monitored user is similar or is different from the group behavioral signature of the plurality of baseline users;

determining that the user belongs in a group with the plurality of baseline users associated with the group behavioral signature when the calculated DoV is less than or equal the predetermined variance threshold;

determining that the user does not belong in the group with the plurality of baseline users associated with the group behavioral signature when the calculated DoV is greater than the predetermined variance threshold; and sending an indication to a destination in the computing system about the determination when the user does not belong to the group with the plurality of baseline users.

2. The method of claim 1, wherein the monitored activity comprises actions of applications related to the monitored user applications running on behalf of the user, when the user is logged in and logged off, or a resource of the computing system accessed by the user.

3. The method of claim 1, wherein the monitored activity comprises a beginning, an end, a frequency, or a duration of an event related to the monitored user.

4. The method of claim 1, wherein the monitored activity comprises observing authentication events related to the monitored user.

5. The method of claim 1, wherein the monitored activity comprises the user's access to the user's computer, a mobile device of the user, or hardware devices related to the monitored user.

6. The method of claim 1, wherein the monitored activity comprises activity in a web browser related to the monitored user.

7. The method of claim 1, wherein the monitored activity comprises network traffic of the user, including one or more of Internet Protocol addresses, port numbers, protocol types, volumes of data sent and received, and types of information sent and received.

8. The method of claim 1, further comprising performing an analysis of a behavior vector of the user using one or more pre-programmed heuristic rules, statistical analysis, a neural network, or support vector machines.

9. The method of claim 1, further comprising performing an analysis of a behavior vector of the user to identify a security incident.

10. The method of claim 1, further comprising performing an action or communicating predetermined information about an identified abnormality of the user based on a behavior vector of the user to at least one destination in the computing system.

11. A system of monitoring user behavior in a computing system for abnormalities compared to a group's behavior in the computing system, the system comprising:

a database storing information about previously classified activities of a plurality of baseline users of the computing system;

a microprocessor coupled to a memory storing instructions, the microprocessor being configured to:

monitor an activity of a user;

calculate a user behavioral signature of the monitored user for the monitored activity as a new behavior vector of values representing event data from the monitored activity;

calculate a degree of variance (DoV) of the monitored activity from a behavior signature of the previously classified activities, wherein the behavior signature of the previously classified activities is a previous behavior vector of values representing events data related to a previously classified activity corresponding to the monitored activity, and the DoV is a distance between the new behavior vector and the previous behavior vector calculated by mathematical vector multiplication;

compare the calculated DoV to a predetermined variance threshold;

determine that the user belongs in a group with the plurality of baseline users associated with the behavior signature of the previously classified activities when the calculated DoV is less than or equal the predetermined variance threshold;

determine that the user does not belong in the group with the plurality of baseline users associated with the behavior signature of the previously classified activities when the calculated DoV is greater than the predetermined variance threshold; and send an indication to a destination in the computing system about the determination when the user does not belong to the group with the plurality of baseline users.

12. The system of claim 11, wherein the monitored activity comprises actions of applications related to the monitored user applications running on behalf of the user, when the user is logged in and logged off, or a resource of the computing system accessed by the user.

13. The system of claim 11, wherein the monitored activity comprises a beginning, an end, a frequency, or a duration of events related to the monitored user.

14. The system of claim 11, wherein the monitored activity comprises authentication events related to the monitored user.

15. The system of claim 11, wherein the monitored activity comprises the user's access to the user's computer, a mobile device of the user, or hardware devices related to the monitored user.

16. The system of claim 11, wherein the monitored activity comprises activity in a web browser related to the monitored user.

17. The system of claim 11, wherein the monitored activity comprises network traffic of the user, including one or more of Internet Protocol addresses, port numbers, protocol types, types of peripheral devices, volumes of data sent and received, and types of information sent and received.

18. The system of claim 11, wherein the microprocessor is further configured to perform an analysis of a behavior vector of the user using one or more of predetermined heuristic rules, statistical analysis, a neural network, or support vector machines.

19. The system of claim 11, wherein the microprocessor is further configured to perform an analysis of a behavior vector of the user to identify a security incident.

20. The system of claim 11, wherein the microprocessor is further configured to perform an action or communicate information about an identified abnormality of the user based on a behavior vector of the user to at least one destination in the computing system.

* * * * *